United States Patent
Kim et al.

(10) Patent No.: US 8,751,426 B2
(45) Date of Patent: Jun. 10, 2014

(54) APPARATUS AND METHOD FOR GENERATING CONTEXT-AWARE INFORMATION USING LOCAL SERVICE INFORMATION

(75) Inventors: Su Myeon Kim, Hwaseong-si (KR); Tae Ho Jang, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 288 days.

(21) Appl. No.: 12/939,826

(22) Filed: Nov. 4, 2010

(65) Prior Publication Data

US 2011/0191279 A1   Aug. 4, 2011

(30) Foreign Application Priority Data

Jan. 29, 2010   (KR) .................. 10-2010-0008490

(51) Int. Cl.
    *G06F 17/00*   (2006.01)
(52) U.S. Cl.
    USPC .......................................................... 706/46
(58) Field of Classification Search
    None
    See application file for complete search history.

(56) References Cited

U.S. PATENT DOCUMENTS

| | | | | |
|---|---|---|---|---|
| 7,747,963 | B2 * | 6/2010 | Othmer et al. | 715/774 |
| 2008/0155453 | A1 * | 6/2008 | Othmer | 715/774 |
| 2008/0243821 | A1 * | 10/2008 | Delli Santi et al. | 707/5 |
| 2008/0288354 | A1 * | 11/2008 | Flinn et al. | 705/14 |
| 2008/0288355 | A1 * | 11/2008 | Rosen | 705/14 |
| 2008/0304512 | A1 * | 12/2008 | Jung et al. | 370/464 |
| 2009/0036102 | A1 * | 2/2009 | Ho | 455/412.2 |
| 2009/0176475 | A1 * | 7/2009 | Salkini et al. | 455/404.1 |
| 2009/0239552 | A1 * | 9/2009 | Churchill et al. | 455/456.3 |
| 2010/0197325 | A1 * | 8/2010 | Dredge | 455/456.3 |
| 2011/0029370 | A1 * | 2/2011 | Roeding et al. | 705/14.38 |
| 2011/0082752 | A1 * | 4/2011 | Dube et al. | 705/14.67 |

FOREIGN PATENT DOCUMENTS

| | | |
|---|---|---|
| KR | 10-2002-0044404 | 6/2002 |
| KR | 10-2005-0101879 | 10/2005 |
| KR | 10-2007-0058857 | 6/2007 |
| KR | 10-2008-0052158 | 6/2008 |
| KR | 10-2008-0054700 | 6/2008 |
| KR | 10-2008-0096614 | 10/2008 |
| KR | 10-2009-0000402 | 1/2009 |
| KR | 10-2009-0001477 | 1/2009 |
| KR | 10-2009-0064937 | 6/2009 |

OTHER PUBLICATIONS

Duri, An Approach to Providing a Seamless End-User Experience for Location-Aware Applications, 2001.*
Bahl et al, Enhancements to the RADAR User Location and Tracking System, 2000.*
Helal et al, Drishti: An Integrated Navigation System for Visually Impaired and Disabled, 2001.*
Kjeldskov et al, "Just-in-Place" Information for Mobile Devices, 2002.*

(Continued)

*Primary Examiner* — Jeffrey A Gaffin
*Assistant Examiner* — Mikayla Chubb
(74) *Attorney, Agent, or Firm* — NSIP Law

(57) ABSTRACT

A context-aware information obtaining method and apparatus uses local service information. A communication apparatus may receive local service information associated with a location of the communication apparatus. The communication apparatus may interpret the local service information to generate context-aware information of the communication apparatus.

15 Claims, 9 Drawing Sheets

(56) References Cited

OTHER PUBLICATIONS

Leonhardi et al, Virtual Information Towers—A Metaphor for Intuitive, Location-Aware Information Access in a Mobile Environment, 1999.*

Patterson et al, Opportunity Knocks: A System to Provide Cognitive Assistance with Transportation Services, 2004.*

Patterson et al, Inferring High-Level Behavior from Low-Level Sensors, 2003.*

Bellotti et al, Activity-Based Serendipitous Recommendations with the Magitti Mobile Leisure Guide, 2008.*

* cited by examiner

APPARATUS AND METHOD FOR GENERATING CONTEXT-AWARE INFORMATION USING LOCAL SERVICE INFORMATION

CROSS-REFERENCE TO RELATED APPLICATION(S)

This application claims the benefit under 35 U.S.C. §119(a) of Korean Patent Application No. 10-2010-0008490, filed on Jan. 29, 2010, in the Korean Intellectual Property Office, the entire disclosure of which is incorporated herein by reference for all purposes.

BACKGROUND

1. Field

The following description relates to a communication apparatus and method, and more particularly, to a method and apparatus that may infer a context of a user using the communication apparatus to provide context-aware information associated with the user.

2. Description of Related Art

People demand to have a desired IT service whenever and wherever they are, since IT technologies and service industries associated with the IT technologies have developed. As one of a number of methods for satisfying the demand, a context-aware service has drawn attention. The context-aware service may sense various contexts of a user and various contexts around the user, such as a location, a speed, and the like, and may infer a current context of the user based on the sensed various contexts to provide a useful service to the user. As an example, the context-aware service may sense a location or a speed of the user, and may infer a context that the user is riding on a car, thereby providing information associated with a rest area or a gas station close to the user or providing information associated with traffic.

Studies on context-awareness have been variously performed in different fields. Recently, due to a focus on a ubiquitous field, an importance of the context-awareness has been understood. However, the context-aware service is difficult to apply to the real world due to a lack of accuracy in predicting the context of the user, despite a necessity or a convenience of the context-aware service.

SUMMARY

In one general aspect, there is provided a communication apparatus, comprising: a local service receiving module configured to receive, from a server, local service information associated with a location of the communication apparatus; and a local service interpreting module configured to interpret the local service information to generate context-aware information of the communication apparatus.

The communication apparatus may further include that: the local service information comprises description information associated with a local service; and the local service interpreting module is further configured to interpret the description information to generate the context-aware information of the communication apparatus.

The communication apparatus may further include that the description information comprises at least one of: a title of the local service, a location providing the local service, and a type of the local service.

The communication apparatus may further include a local service execution module configured to: execute a local service corresponding to the received local service information; and interpret the local service being executed, to generate execution information of the communication apparatus.

The communication apparatus may further include: a context-aware information collecting module configured to collect: the context aware information from the local service receiving module; or the execution information from the local service execution module; a context-aware information processing module configured to: interpret the context aware information collected by the context-aware information collecting module; and infer a context of a user of the communication apparatus; and a context-aware information providing module configured to provide information based on the inferred context of the user of the communication apparatus.

The communication apparatus may further include a local service searching module configured to search for a server providing a local service associated with the location of the communication apparatus to display the retrieved server on the communication apparatus.

In another general aspect, there is provided a method of generating context-aware information, the method comprising: receiving, by a communication apparatus, local service information associated with a location of the communication apparatus from a server; and interpreting, by the communication apparatus, the local service information to generate the context-aware information of the communication apparatus.

The method may further include that: the local service information comprises description information associated with the local service; and the interpreting to generate the context-aware information comprises interpreting of the description information included in the local service information to generate the context aware information of the communication apparatus.

The method may further include that the description information comprises at least one of: a title of the local service, a location providing the local service, and a type of the local service.

The method may further include: executing a local service corresponding to the received local service information; and interpreting the local service being executed, to generate execution information of the communication apparatus.

The method may further include: collecting the context-aware information or the execution information; interpreting the collected context-aware information; inferring a context of a user of the communication apparatus; and providing information based on the inferred context of the user of the communication apparatus.

In another general aspect, there is provided a computer-readable storage medium storing a program for executing a method, comprising: receiving, at the communication apparatus, local service information associated with a location of the communication apparatus from a server; and interpreting, at the communication apparatus, the local service information to generate the context-aware information of the communication apparatus.

The computer-readable storage medium may further include that: the local service information comprises description information associated with the local service; and interpreting the description information included in the local service information to generate the context-aware information of the communication apparatus.

The computer-readable storage medium may further include that the description information comprises at least one of: a title of the local service, a location providing the local service, and a type of the local service.

The computer-readable storage medium may further include: executing a local service corresponding to the received local service information; and interpreting the local service being executed, to generate execution information of the communication apparatus.

The computer-readable storage medium may further include: collecting the context-aware information or the execution information; interpreting the collected context-aware information; inferring a context of a user of the communication apparatus; and providing information based on the context of the user of the communication apparatus.

Other features and aspects may be apparent from the following detailed description, the drawings, and the claims.

Figure 1:
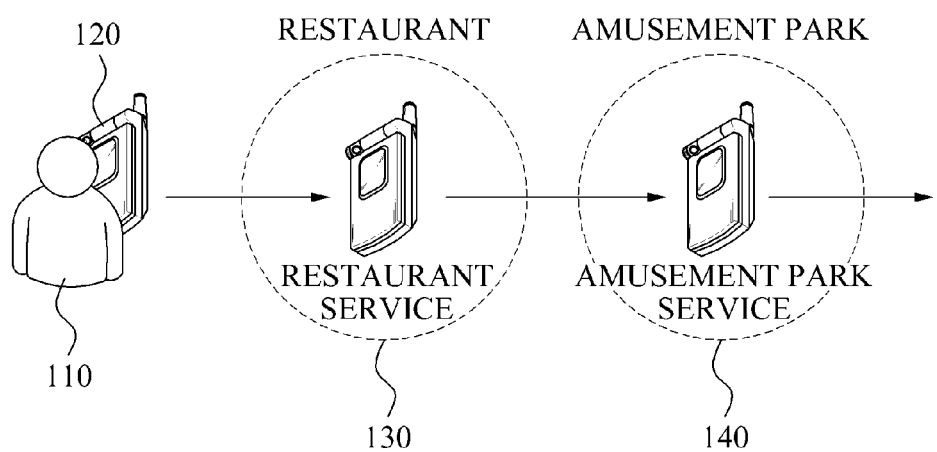
FIG. 1 is a diagram illustrating a local service according to example embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1 illustrates a local service according to example embodiments.

When a user 110 carrying a mobile communication apparatus 120 enters a restaurant 130, the user 110 may use a local service available in the restaurant 130, such as a restaurant service, using the mobile communication apparatus 120. The local service may be a service only provided to a communication apparatus located in a predetermined area or the location service may be a service associated with an area. The restaurant service may be a service only provided to a communication apparatus located in the restaurant, or the restaurant service may be a service associated with the restaurant.

The restaurant service may provide, to the user 110, information associated with the restaurant 130 via the mobile communication apparatus 120. As an example, when the user 110 enters the restaurant 130, the mobile communication apparatus 120 may automatically search for an available local service, and may display, on a screen of the mobile communication apparatus 120, that the restaurant service is retrieved. When the user 110 selects the restaurant service through the mobile communication apparatus 120, information provided by the restaurant service may be displayed. As an example, a menu provided by the restaurant 130, an introduction of food, a review and a rating of the menu, a payment method, and the like may be provided.

Subsequently, when the user 110 leaves the restaurant 130 and enters an amusement park 140, the user 110 may use a local service available in the amusement park 140, such as an amusement park service, using the mobile communication apparatus 120. As an example, as soon as the user 110 enters the amusement park 140 or an area associated with the amusement park, various services provided by the amusement park 140 may be transmitted to the mobile communication apparatus 120 of the user 110. The amusement park service of FIG. 1 may be a service only provided to a communication apparatus located in the amusement park 140, or the amusement park service may be a service associated with the amusement park 140.

The amusement park service may provide, to the user 110, information associated with the amusement park 140 via the mobile communication apparatus 120. As an example, when the user 110 enters the amusement park 140, the mobile communication apparatus 120 may automatically search for an available local service, and the amusement park service associated with the amusement park 140 is retrieved. Subsequently, the mobile communication apparatus 120 may display, on the screen of the mobile communication apparatus 120, that the amusement park service is retrieved. When the user 110 selects the amusement park service through the mobile communication apparatus 120, information provided by the amusement park service may be displayed. As an example, rides in the amusement park 140, a map of the amusement park 140, a review and a rating of the rides, a payment method, and the like may be provided.

A local service may be a service only provided to a communication apparatus located in a predetermined area or may be a service associated with an area. Also, the local service may be provided as text information, image information, and the like. Also, the local service may be provided as a program code, such as a script, a binary code, a machine code, and the like, that is functional in a mobile communication apparatus.

Figure 2:
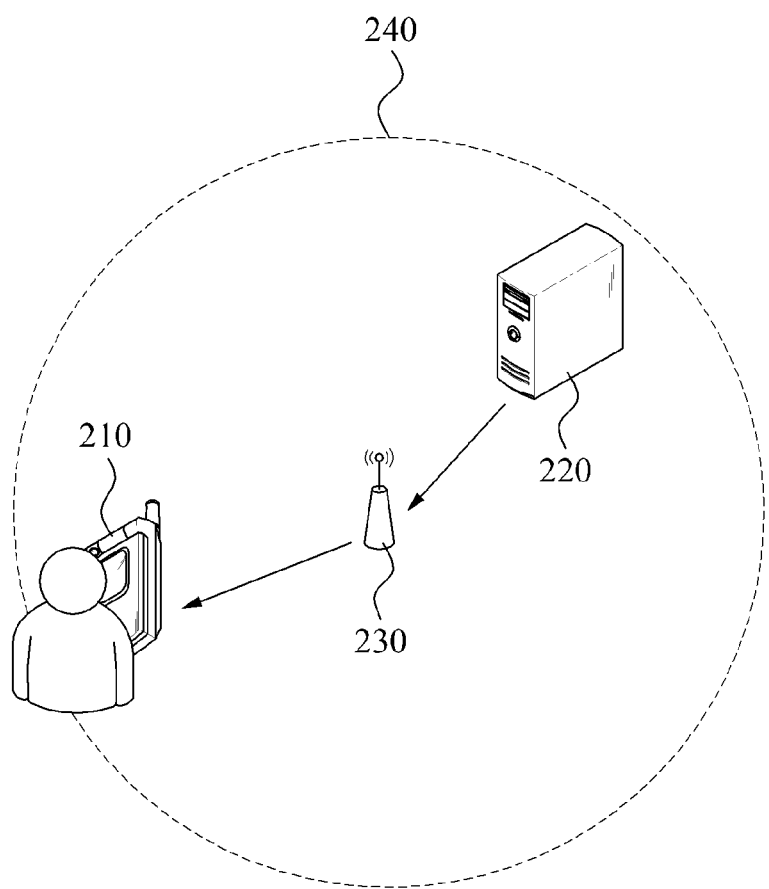
FIG. 2 is a diagram illustrating a mechanism in which a local service server provides a local service according to example embodiments.

FIG. 2 illustrates a mechanism in which a local service server 220 provides a local service according to example embodiments.

The local service server 220 may manage a local service of a predetermined area. The local service server 220 may provide the local service to a communication apparatus 210 located in an area 240 for which the local service server 220 is responsible. Referring to FIG. 1, as an example, there may be a local service server responsible for a local service of an area of the restaurant 130, and there may be a local service server responsible for a local service of an area of the amusement park 140.

Although the local service servers are generally located in zones in which local services of the local service servers are provided, locations of the servers are not limited thereto. For example, physical locations of the local service servers are not limited, and the local service servers may be located outside the zones in which their local services are provided. For example, a listing of restaurant services may be provided at a subway or metro exit. Also, a single local service server may provide a single local service or may provide a plurality of local services. As an example, a restaurant service and an amusement park service may be provided by the same local service server.

A mobile communication apparatus 210 and the local service server 220 are generally connected by a wireless communication, such as a cellular phone scheme, WiFi scheme, a Bluetooth scheme, a ZigBee scheme, a Z-Wave scheme, and the like; however, they may be connected by a wired communication.

When the communication apparatus 210 and the local service server 220 are connected by the wireless communication, the connection may be established by a wireless access point (AP) 230. The local service server 220 may broadcast, through the wireless AP 230, existence of the local service in an area in which the local service server 220 provides the local service for which the local service server 220 responsible. When the mobile communication apparatus 210 enters the area and searches for the local service, the local service provided by the local service server 220 may be retrieved. The retrieved local service may be displayed on the mobile communication apparatus 210. When the retrieved local service is selected, the mobile communication apparatus 210 may request local service information from the local service server 220. The local service server 220 may transmit the requested local service information to the mobile communication apparatus 210. The mobile communication apparatus 210 may receive the transmitted local service information and may display the received local service information.

Figure 3A:
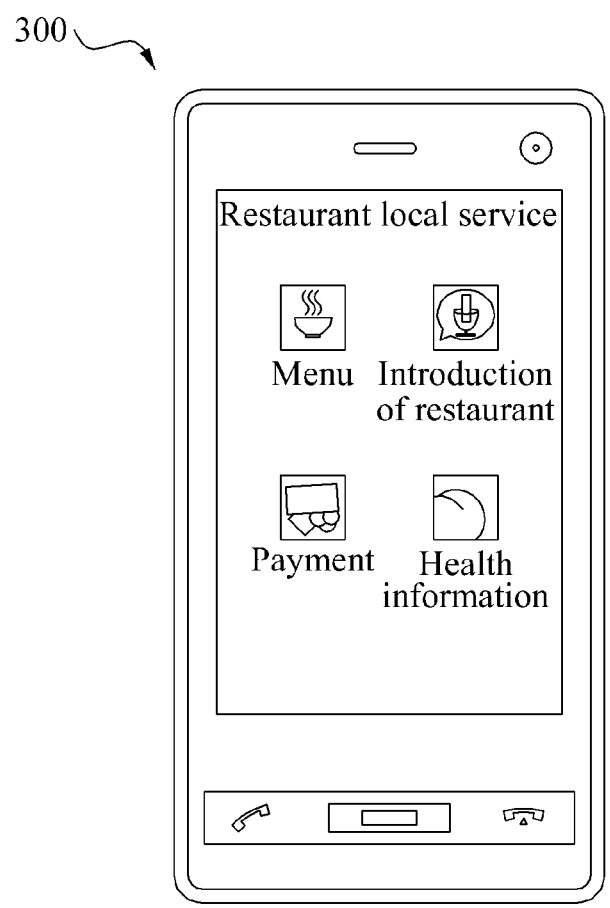
FIGS. 3A and 3B are diagrams illustrating an example of providing a local service according to example embodiments.
Figure 3B:
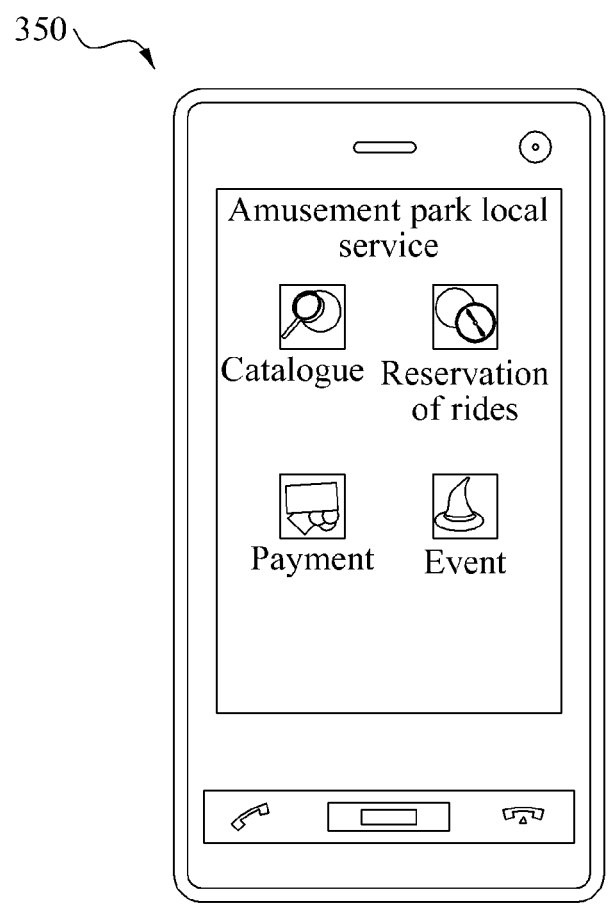

FIGS. 3A and 3B illustrate examples of providing a local service according to example embodiments A terminal 300 of FIG. 3A is an example of a screen displayed on a mobile communication apparatus when a restaurant local service is provided. The restaurant local service of the terminal 300 of FIG. 3A provides a menu, an introduction of the restaurant, a payment method, health information, and the like. When an icon or prompt displayed on the mobile communication apparatus is selected, a corresponding service may be provided. As an example, when a user selects an icon of the menu, a type of dish provided by the restaurant, a price, a picture, a description, and a review and a rating of the corresponding dish may be displayed. When the user selects an icon of the introduction of the restaurant, a history of the restaurant, an owner, a memorable episode, reviews and ratings of other users, and the like may be displayed. Also, the user may select an icon of the payment method to pay for the food. Also, the user may select an icon of the health information to obtain health information associated with the food. The terminal 300 of FIG. 3A is only an example, and each restaurant may provide a corresponding local service based on its own method.

A terminal 350 of FIG. 3B is an example of a screen displayed on the mobile communication apparatus when an amusement park local service is provided. The amusement park local service of the terminal 350 of FIG. 3B may provide a service, such as a catalogue, a reservation of rides, a payment method, an event, and the like. When an icon or prompt displayed on the mobile communication apparatus is selected, a corresponding service may be provided. As an example, when the user selects an icon of the catalog, a map of the amusement park, description about facilities and rides, and the like may be displayed. Also, when the user selects an icon of the reservation of the rides, information associated with bookable rides may be displayed. When the user selects a desired ride, the user may remotely reserve the corresponding ride. Also, when the user selects an icon of the payment method, the user may pay for the ride, may pay for food of a restaurant in the amusement park, may pay for a souvenir in a souvenir shop, or the like. Also, when the user selects an icon of the event, information associated with various events in the amusement park may be displayed on the mobile communication apparatus. The terminal 350 of FIG. 3B is just an example, and a local service may be differently provided depending on a corresponding amusement park. As an example, a number of icons displayed on the mobile communication apparatus, a type of icon, and contents of a provided service, and the like may be different.

Figure 4:
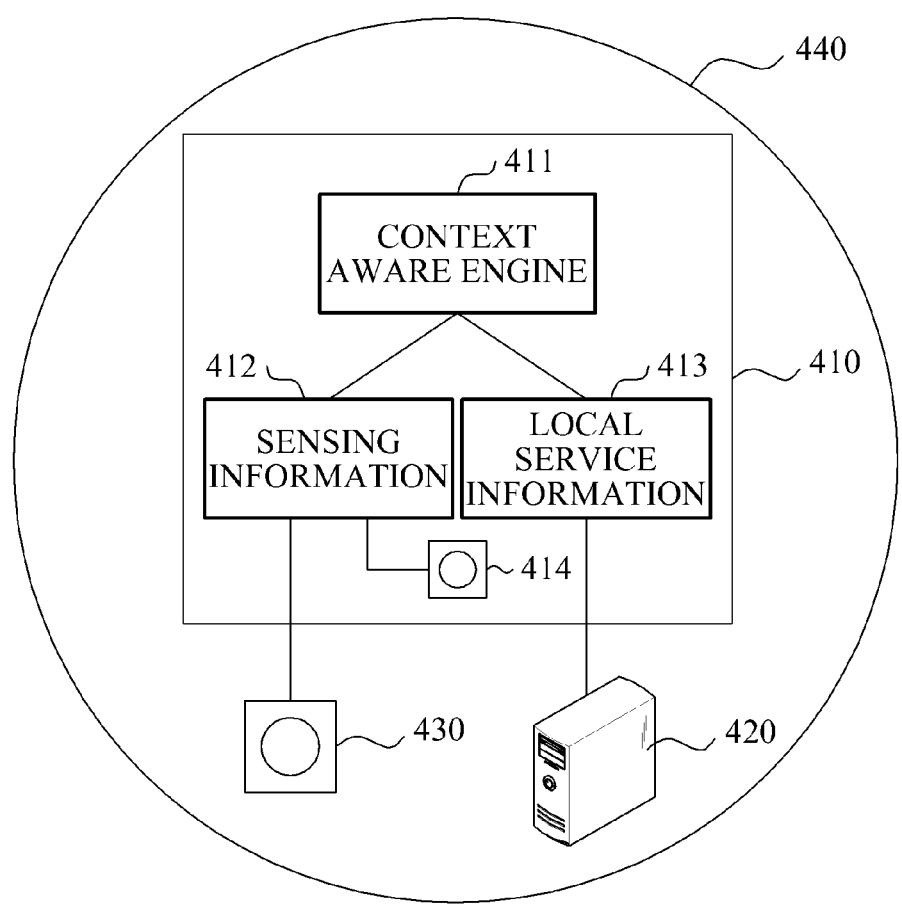
FIG. 4 is a diagram illustrating a method of performing context-awareness in a communication apparatus according to example embodiments.

FIG. 4 illustrates a method of performing context-awareness in a communication apparatus according to example embodiments.

A mobile communication apparatus 410 according to example embodiments may include a context-aware engine 411. The context-aware engine 411 may interpret sensing information 412 received from an external sensor/sensing device 430 and/or an internal sensor/sensing device 414, and/or may interpret local service information 413 received from a local service server 420, to generate context-aware information.

The context-aware information may be information associated with the user and surroundings around the user at a time when the user performs interaction, and may include information associated with a motion of the user, a change in a state, and the like. As an example, the information may be information indicating "the user enters restaurant A," information indicating "the user purchases an i-pod," and the like. The context-aware engine 411 may generate context-aware information using the sensing information 412 and/or the local service information 413, and may interpret and/or may infer the context-aware information to provide a service that is appropriate for a context of the user, e.g., a context-aware service. As an example, a location and a speed of the user may be sensed, and a context that the user is riding on a car may be inferred, and thus, information associated with a rest area or a gas station close to the user or information associated with traffic may be provided based on the inferred context.

The context-aware engine 411 may receive sensing information 412 from the external sensor/sensing device 430. Also, the mobile communication apparatus 410 may include an internal sensor/sensing device 414. In this instance, the context-aware engine 411 may receive sensing information 412 from the internal sensor/sensing device 414. The context-aware engine 411 may interpret the sensing information 412 received from the external sensor/sensing device 430 and/or internal sensor/sensing device 414, and may infer a context of a user of the mobile communication apparatus 410.

The external sensor/sensing device 430 may include a sensor network. The internal sensor/sensing device 414 may include a user interface of the mobile communication apparatus 410. The user may input his/her context-aware information via the user interface of the mobile communication apparatus 410, such as a keypad and a touch screen. Also, environmental context-aware information, such as a current temperature, a humidity, and the like, may be input by the external sensor/sensing device 430 and/or the internal sensor/sensing device 414. Also, information, such as a body temperature, a blood pressure, and the like, may be directly collected by the internal sensor/sensing device 414 included in the mobile communication apparatus 410, may be collected by the external sensor/sensing device 430, or may be collected by a communication with a sensor network. Also, a brightness of a light may be sensed by a photosensitive semiconductor device, a slope and a motion may be sensed by an accelerometer and a gyro sensor, an adjacent object may be sensed by a infrared light sensor, and a sound may be sensed by a microphone and the like.

Information associated with a location change of the mobile communication apparatus 410 may be provided to the mobile communication apparatus 410 using a location based service (LBS) or a global positioning system (GPS). In the LBS, a location of the mobile communication apparatus 410 may be calculated based on parameters, such as a strength of a signal of the mobile communication apparatus 410, a time of arrival (TOA) of the signal, a time difference of arrival (TDOA) of the signal, an angle of arrival (AOA) of the signal, and the like. In the GPS, a receiver included in the mobile communication apparatus 410 may receive GPS signals of satellites in the earth's orbit, and may calculate the location of the mobile communication apparatus 410 based on the received GPS signals. In this instance, the GPS receiver may act as the internal sensor/sensing device 414.

The context-aware engine 411 may interpret the local service information 413 received from the local service server 420 to generate the context-aware information, and may interpret and/or may infer the context-aware information to provide information appropriate for a context of the user, e.g., the context-aware service. The mobile communication terminal 410 may receive the local service information 413 from the local service server 420 of a local service zone 440 in which the mobile communication terminal currently exists.

The context-aware engine 411 may interpret and/or infer the context of the user based on both the sensing information 412 from the external sensor/sensing device 430 and the internal sensor/sensing device 414 and the local service information 413 from the local service server 420, providing an improved context-aware service. The context-aware engine 411 may correct, based on the local service information 413 from the service server 420, the context-aware information obtained based on the sensing information 412 from the external sensor/sensing device 430 and the internal sensor/sensing device 414. Also, the context-aware engine 411 may correct, based on the sensing information 412 from the external sensor/sensing unit 430 and the internal sensor/sensing unit 414, the context-aware information obtained based on the local service information 413 from the local service server 420.

The local service may appropriately show a characteristic of surroundings around the user and/or an intention of the user, and local service information provided from the local service may be used for performing context-awareness, and thus, a quality of context-awareness may be improved.

As an example, context-aware information indicating that the user moves at a high speed may be obtained based on information associated with a location and a speed of the mobile communication apparatus, information being received from a sensor. In this instance, context-aware information accurately indicating whether the user is riding on a car or a train may not be obtained based only on the information. In this instance, when the mobile communication apparatus receives local service information of the train only provided inside the train, the mobile communication apparatus may determine that "the user is riding on the train."

Also, when the mobile communication apparatus receives the train local service information only provided inside the train local service information, the mobile communication apparatus may recognizes that the user is in the train. However, context-aware information accurately indicating whether the train is moving or stops may not be obtained. In this instance, when the mobile communication apparatus obtains the context-aware information indicating that the user is moving at a high speed, obtained based on information associated with the location and the speed input by the sensor, the mobile communication apparatus may obtain more accurate context-aware information indicating that "the user is on a moving train."

Figure 5:
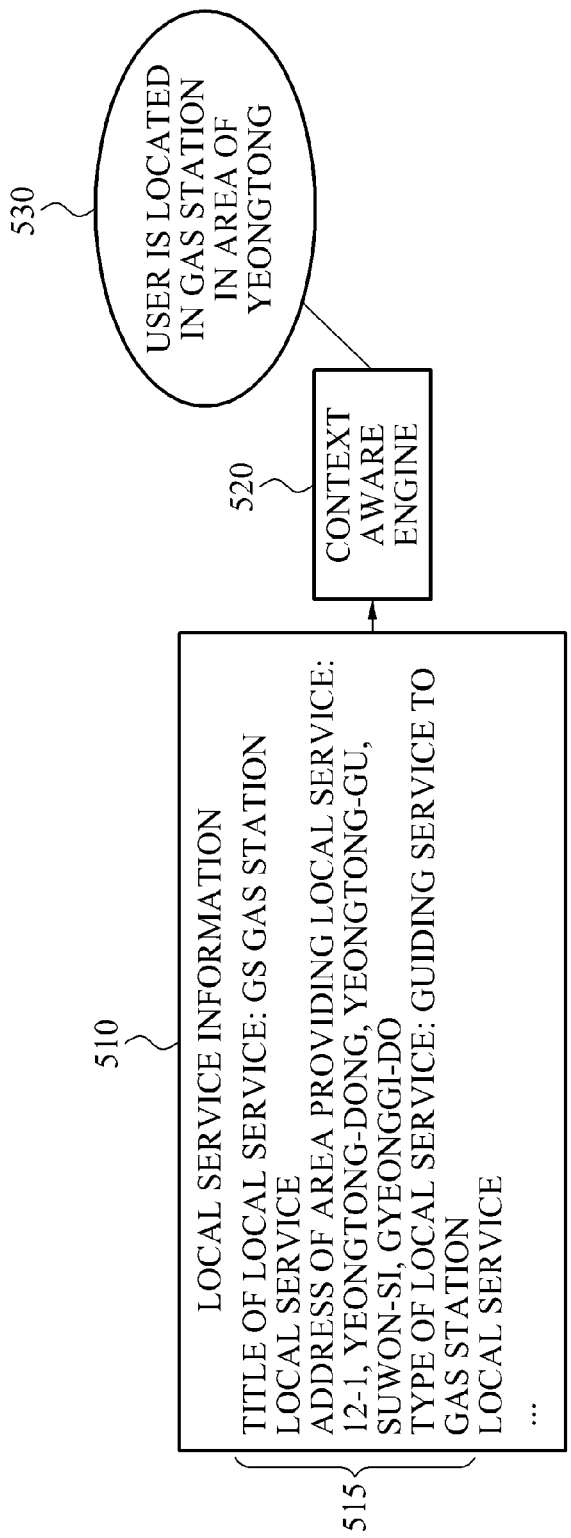
FIG. 5 is a diagram illustrating an example of generating context-aware information based on description information associated with a local service according to example embodiments.

FIG. 5 illustrates an example of generating context-aware information based on description information associated with a local service according to example embodiments.

Local service information transmitted by a local service server may include the description information associated with the local service. The description information may include at least one of a title of the local service, an area providing the local service, and a type of the local service. The description information may be provided as meta information. The description information may be provided in a form of XML.

Referring to FIG. 5, local service information 510 may include description information 515. According to the description information 515, a title of the local service is "GS gas station local service," an address of an area providing the local service is "12-1, Yeongtong-dong, Yeongtong-gu, Suwon-si, Gyeonggi-do", and a type of the local service is "guiding service to gas station." A context-aware engine 520 may interpret the description information 515 to generate the context-aware information. The context-aware engine 520 may draw more accurate context-aware information 530 indicating that the user is located in a "gas station" in an area of "Yeongtong."

Figure 6:
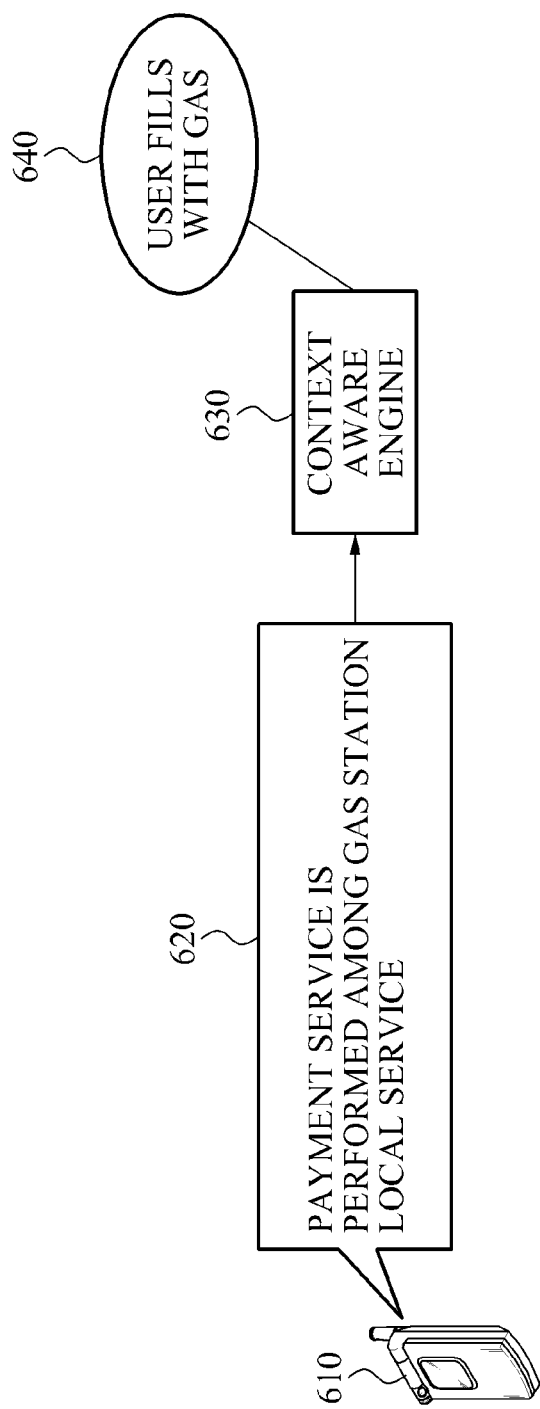
FIG. 6 is a diagram illustrating an example of generating context-aware information based on execution information associated with a local service according to example embodiments.

FIG. 6 illustrates an example of generating context-aware information based on execution information associated with a local service according to example embodiments.

A mobile communication apparatus may execute a local service corresponding to received local service information. In this instance, the mobile communication apparatus may interpret the local service being executed, to generate the context-aware information of the communication apparatus. The execution information of the local service may provide more accurate information associated with a current motion of the user, and thus, more accurate context-aware information may be obtained.

Referring to FIG. 6, the user may pay for gas using a gas station local service 620 received by a user's own mobile communication apparatus 610. A context-aware engine 630 may interpret information indicating that a payment service is performed among various gas station local services to draw context-aware information 640 indicating that "the user fills up with gas."

Figure 7:
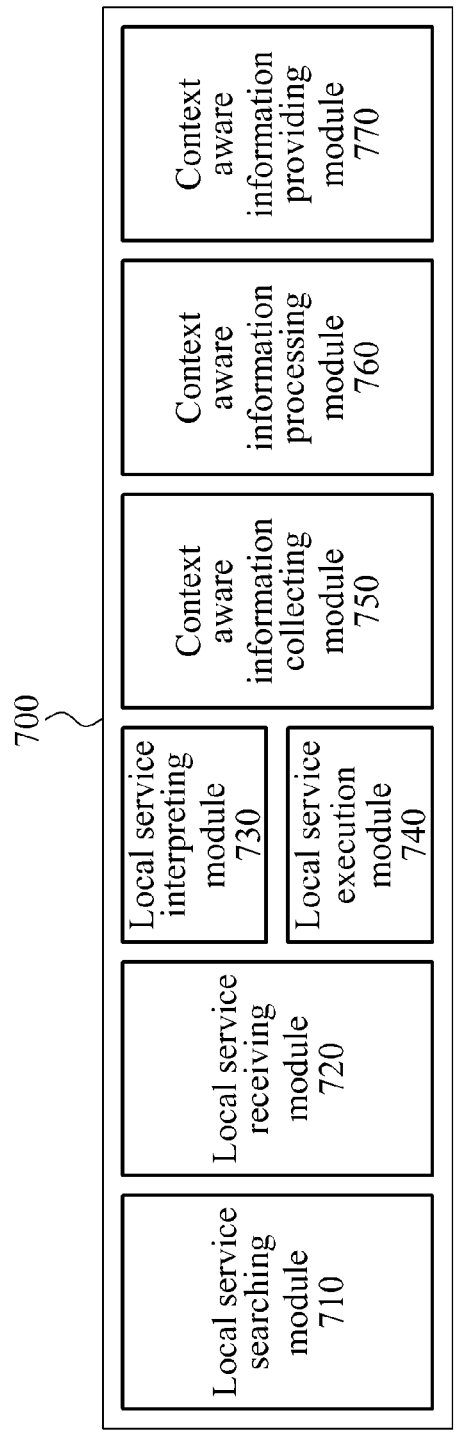
FIG. 7 is a block diagram illustrating a communication apparatus that generates context-aware information based on local service information according to example embodiments.

FIG. 7 illustrates a communication apparatus 700 that generates context-aware information based on local service information according to example embodiments.

The communication apparatus 700 of FIG. 7 may include modules associated with local service and modules associated with context-aware information, and the modules associated with the local service may search for a local service and may perform the local service, and the modules associated with the context-aware information may receive information from the modules associated with the local service to generate the context-aware information. The modules associated with the local service may include a local service searching module 710, a local service receiving module 720, a local service interpreting module 730, and a local service execution module 740. Also, the module associated with the context-aware information may include a context-aware information collecting module 750, a context-aware information processing module 760, and a context-aware information providing module 770.

The local service searching module 710 may search for a local service server providing a local service associated with a location in which the communication apparatus 700 is located. Local service servers may broadcast basic information associated with their local services in areas for which the local service servers are responsible. When the communication apparatus 700 moves inside the area, the communication apparatus 700 may receive the broadcasted information, and may search for the local service server based on the broadcasted information. Also, the local service searching module 710 may search for the local service server based on a predetermined communication protocol. A number of retrieved local service servers may be zero, one, or more than one. Also, the local service searching module 710 may display the retrieved local service server on the communication apparatus 700.

The local service receiving module 720 may receive, from the local service server, local service information associated with a location of the communication apparatus 700. For example, the local service information may include description information associated with the local service. The description information may include at least one of a title of the local service, an area providing the local service, and a type of the local service. When a user selects one of local services retrieved by the local service searching module 710 and displayed on the communication apparatus 700, the local service receiving module 720 may receive corresponding local service information from the local service server and may transmit the received local service information to the local service execution module 740. Subsequently, the local service execution module 740 may execute the local service to provide the local service to the user.

The local service interpreting module 730 may interpret the local service information received from the local service sever to generate the context-aware information of the communication apparatus 700. When the local service information includes description information, the local service interpreting module 730 may interpret the description information to generate the context-aware information of the communication apparatus 700. The description information may be provided as meta data. Also, the description information may be provided in a predetermined format. In this instance, the local service interpreting module 730 may recognize a type of information included in a corresponding field. As an example, when information associated with an area providing the local service is included in a local service address field, the local service interpreting module 730 may interpret the local service address field to obtain context-aware information associated with the area providing the local service. In addition, the local service interpreting module 730 may parse the local service information and may perform a natural language processing scheme to obtain the context-aware information. The local service interpreting unit 730 may transmit the obtained context-aware information to the context-aware information collecting module 750.

The local service execution module 740 may execute a local service corresponding to the local service information received from the local service server. When the local service server provides text information, image information, and the like, the local service execution module 740 may display the information on the communication apparatus 700. When the local service is provided as a program code, such as a script, a binary code, machine code, and the like, that is functional in a mobile communication apparatus, the local service execution module 740 may perform the program code. In the example of the payment service in FIG. 3, a corresponding payment program may be performed by the local service execution module 740. The local service execution module 740 may communicate with an outside when the communication with the outside is desired.

The local service execution module 740 may interpret the local service being executed, to generate execution information of the communication apparatus 700. The local service execution module 740 may execute local service corresponding to the received local service information. In this instance, the local service execution module 740 may interpret the local service being executed, to generate the execution information. As an example, when the user pays for gas using a gas station local service received by the mobile communication apparatus 700 of the user, the local service execution module 740 may interpret the information indicating that a payment service is performed among gas station local services to draw context-aware information indicating that "the user fills up with gas." The local service execution module 740 may transmit the generated execution information to the context-aware information collecting module 750.

The context-aware information collecting module 750 may collect the context-aware information from the local service receiving module 720. Also, the context-aware information collecting module 750 may collect the context-aware information from an external sensor and/or an internal sensor of the communication apparatus 700. Also, the context-aware information collecting module 750 may collect the execution information from the local service execution module 740.

The context-aware information processing module 760 may interpret context-aware information collected by the context-aware information collecting module 750, and may infer a context of a user of the communication apparatus 700. The context-aware information processing module 760 may process the execution information and/or the context-aware information collected by the context-aware information collecting module 750 to generate secondary context-aware information.

The context-aware information processing module 760 may be designed as a rule-based module. The context-aware information processing module 760 may store, as a rule, secondary context-aware information corresponding to a combination of execution information and/or context-aware information predicted to be collected. The context-aware information processing module 760 may search, from the rule, for the secondary context-aware information corresponding to the combination of the execution information and/or the context-aware information received from the context-aware information collecting module 750. Accordingly, the secondary context-aware information may be generated. As an example, when a speed of the communication apparatus 700 is greater than or equal to 80 km per hour, and the local service receiving module 720 receives train local service information only provided inside the train, the secondary context-aware information may be stored as a rule indicating that "the user is riding on the train." In this instance, when the context-aware information collected by the context-aware information collecting module 750 indicates that "the speed of the communication apparatus 700 is greater than or equal to 80 km per hour and the local service receiving module 720 receives the train local service information only provided inside the train," the context-aware information processing module 760 may generate the secondary context-aware information indicating that "the user is riding on the train" based on the rule.

The context-aware information providing module 770 may provide, to the user or to an external application program, information and/or service based on the context of the user of the communication apparatus 700, the context being inferred by the context-aware information processing module 760. As an example, when the secondary context-aware information indicating that "the user is riding on the train" is generate by the context-aware information processing module 760, the context-aware information providing module 770 may display, on the communication apparatus 700, approaching stops of the train and information associated with the stops.

Figure 8:
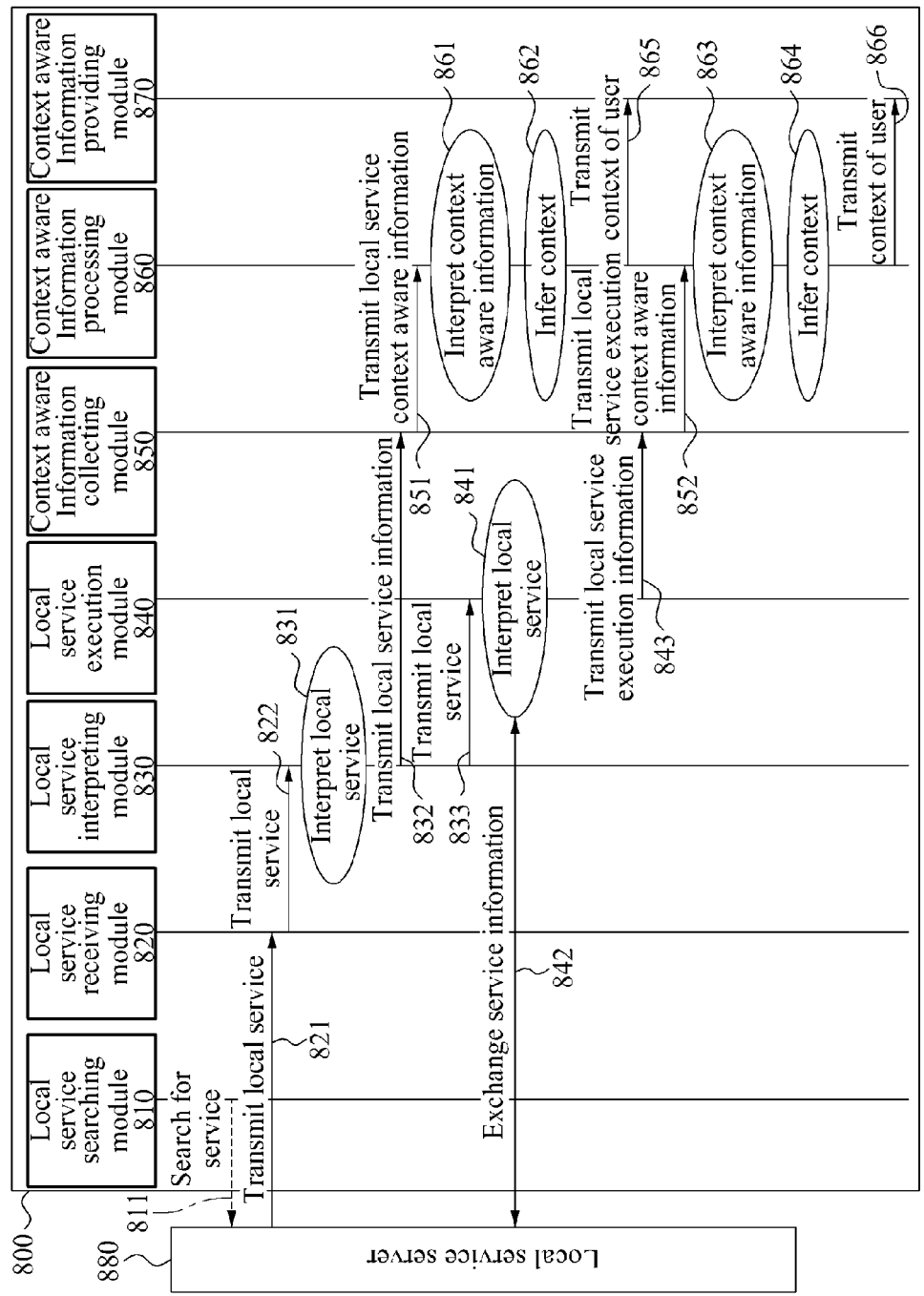
FIG. 8 is a flowchart illustrating a method of generating context-aware information based on local service information according to example embodiments.

FIG. 8 illustrates a method of generating context-aware information based on local service information according to example embodiments.

A mobile communication apparatus 800 of FIG. 8 may include a local service searching module 810, a local service receiving module 820, a local service interpreting module 830, a local service execution module 840, a context-aware information collecting module 850, a context-aware information processing module 860, and a context-aware information providing module 870.

In operation 811, the local service searching module 810 searches for a local service server 880 providing a local service associated with a location of the communication apparatus 800. The local service searching module 810 may search for the local service by receiving help from a server or by directly scanning a local service server around the local service searching module 811. Also, the local service searching module 810 may display the retrieved local service server on the communication apparatus 800.

In operation 821, the local service receiving module 820 may receive, from the local service server 880, local service information associated with a location of the communication apparatus 800. For example, the local service information may include description information associated with the local service. The description information may include at least one of a title of the local service, an area providing the local service, and a type of the local service. A local service may be selected by a user or may be selected based on a predetermined condition, from among local services retrieved by the local service searching module 810. The local service receiving module 820 may receive the local service information from the local service server 880 providing the selected local service.

In operation 822, the local service information received by the local service receiving module 820 may be transmitted to the local service interpreting module 830.

In operation 831, the local service interpreting module 830 may interpret local service information transmitted from the local service receiving module 820. The local service interpreting module 830 may interpret the local service information received from the local service server 880 to generate context-aware information of the communication apparatus 800. The local service interpreting module 830 may parse the local service information and may perform a natural language processing scheme to obtain the context-aware information. Information that is determined to be helpful for context-awareness during an interpreting process of the local service interpreting module 830 is transmitted to the context-aware information collecting module 850 in operation 832.

In operation 833, the local service execution module 840 receives the local service information. In operation 841, the local service execution module 840 executes a local service corresponding to the local service information. The local service execution module 840 may communicate with an outside when the communication with the outside is desired.

In operation 842, the local service execution module 840 may communicate with the local service server 880 while executing the local service.

Also, the local service execution module 840 may interpret the local service being executed, to generate execution information of the communication apparatus 800. The local service execution module 840 may execute the local service corresponding to the received local service. In this instance, the local service execution module 840 may interpret the local service being executed, to generate the execution information. In operation 843, the local service execution module 840 may transmit the generated execution information to the context-aware information collecting module 850.

The context-aware information collecting module 850 collects the context-aware information from the local service interpreting module 830 in operation 832. Also, the context-aware information collecting module 850 may collect context-aware information from an external sensor and/or an internal sensor of the communication apparatus 800. Also, the context-aware information collecting module 850 may collect the execution information from the local service execution module 840 in operation 843.

In operation 851, the context-aware information collecting module 850 may transmit local service context-aware information received from the local service interpreting module 830 to the context-aware information processing module 860. Also, the context-aware information collecting module 850 may transmit local service execution information, e.g., local service execution context-aware information, received from the local service execution module 840 to the context-aware information processing module 860.

The context-aware information processing module 860 may interpret the context-aware information collected by the context-aware information collecting module 850 in operations 861 and 863, and may infer a context of a user of the communication apparatus 800 in operations 862 and 864. The context-aware information processing module 860 may process the context-aware information and/or the execution information collected by the context-aware information collecting module 850 to generate secondary context-aware information. The context-aware information processing module 860 may transmit the processed secondary context-aware information to the context-aware information processing module 870 in operations 865 and 866. The context-aware information processing module 860 may interpret the context based on a combination of the context-aware information and the execution information, more accurately inferring the context of the user.

The context-aware information processing module 870 may provide, to the user or to an external application program, information and/or service based on the context of the user of the communication apparatus 800, the context being inferred by the context-aware information processing module 860.

As a non-exhaustive illustration only, the terminal device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, and devices such as a desktop PC, a high definition television (HDTV), an optical disc player, a setup box, and the like capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the devices described herein may refer to mobile devices such as a cellular phone, a personal digital assistant (PDA), a digital camera, a portable game console, and an MP3 player, a portable/personal multimedia player (PMP), a handheld e-book, a portable tablet and/or laptop PC, a global positioning system (GPS) navigation, and devices such as a desktop PC, a high definition television (HDTV), an optical disc player, a setup and/or set top box, and the like, consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of example embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication apparatus, comprising:
a sensor configured to sense context of a user of the communication apparatus and/or context around the communication apparatus;
a processor configured to predict context-aware information about the user of the communication apparatus based on the sensed context; and
a receiver configured to receive, from a server, local service information comprising information about at least one of a type and a title of a local service that is received by the communication apparatus,
wherein the processor is further configured to process the local service information to improve an accuracy of the predicted context-aware information about the user of the communication apparatus based on at least one of the type and the title of the local service that is received by the communication apparatus.

2. The communication apparatus of claim 1, wherein the local service information comprises the title of the local service, a location providing the local service, and the type of the local service.

3. The communication apparatus of claim 1, further comprising a local service execution module configured to:
execute a local service corresponding to the received local service information; and
interpret the local service being executed, to generate execution information of the communication apparatus.

4. The communication apparatus of claim 3, further comprising:
a context-aware information collecting module configured to collect the context-aware information from the receiver or the execution information from the local service execution module;
a context-aware information processing module configured to interpret the context-aware information collected by the context-aware information collecting module and infer a context of a user of the communication apparatus; and
a context-aware information providing module configured to provide information based on the inferred context of the user of the communication apparatus.

5. The communication apparatus of claim 1, further comprising a local service searching module configured to search for a server providing a local service associated with the location of the communication apparatus to display the retrieved server on the communication apparatus.

6. A method of generating context-aware information, the method comprising:
sensing, via a sensor, context of a user of a communication apparatus and/or context around the communication apparatus;
predicting context-aware information about the user of the communication apparatus based on the sensed context;
receiving local service information from a server, the local service information comprising information about at least one of a type and a title of a local service that is received by the communication apparatus; and processing the local service information to improve an accuracy of the predicted context-aware information about the user of the communication apparatus based on at least one of the type and the title of the local service that is received by the communication apparatus.

7. The method of claim 6, wherein the local service information comprises the title of the local service, a location providing the local service, and the type of the local service.

8. The method of claim 6, further comprising:
executing a local service corresponding to the received local service information; and
interpreting the local service being executed, to generate execution information of the communication apparatus.

9. The method of claim 8, further comprising:
collecting the context-aware information or the execution information;
interpreting the collected context-aware information;
inferring a context of a user of the communication apparatus; and
providing information based on the inferred context of the user of the communication apparatus.

10. A non-transitory computer-readable storage medium storing a program for executing a method, the method comprising:
sensing, via a sensor, context of a user of a communication apparatus and/or context around the communication apparatus;
predicting context-aware information about the user of the communication apparatus based on the sensed context;
receiving local service information from a server, the local service information comprising information about at least one of a type and a title of a local service that is received by the communication apparatus; and
processing the local service information to improve an accuracy of the predicted context-aware information about the user of the communication apparatus based on at least one of the type and the title of the local service that is received by the communication apparatus.

11. The computer-readable storage medium of claim 10, wherein the local service information comprises the title of the local service, a location providing the local service, and the type of the local service.

12. The computer-readable storage medium of claim 10, further comprising:
executing a local service corresponding to the received local service information; and
interpreting the local service being executed, to generate execution information of the communication apparatus.

13. The computer-readable storage medium of claim 12, further comprising:
collecting the context-aware information or the execution information;
interpreting the collected context-aware information;
inferring a context of a user of the communication apparatus; and
providing information based on the context of the user of the communication apparatus.

14. The communication apparatus of claim 1,
wherein the processor is configured to further improve the accuracy of the detected context of the user of the communication apparatus based on the processed local service information and description information of the local service information which are received from the server.

15. The communication apparatus of claim 1, wherein the context-aware information about the user comprises a prediction about an activity being performed by the user at a time at which the local service is being used by the communication apparatus.

* * * * *